United States Patent
Gomez Padin

(10) Patent No.: US 12,494,127 B2
(45) Date of Patent: Dec. 9, 2025

(54) PARKING AID CONTROL SYSTEM AND METHOD

(71) Applicant: JAGUAR LAND ROVER LIMITED, Warwickshire (GB)

(72) Inventor: Ruben Gomez Padin, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 198 days.

(21) Appl. No.: 18/250,837

(22) PCT Filed: Oct. 29, 2021

(86) PCT No.: PCT/EP2021/080199
§ 371 (c)(1),
(2) Date: Apr. 27, 2023

(87) PCT Pub. No.: WO2022/090508
PCT Pub. Date: May 5, 2022

(65) Prior Publication Data
US 2023/0394972 A1    Dec. 7, 2023

(30) Foreign Application Priority Data
Oct. 30, 2020 (GB) .................................. 2017206

(51) Int. Cl.
*G08G 1/16* (2006.01)
*B60T 8/58* (2006.01)
(Continued)

(52) U.S. Cl.
CPC .............. *G08G 1/168* (2013.01); *B60W 50/14* (2013.01); *B62D 15/027* (2013.01); *B60T 8/58* (2013.01);
(Continued)

(58) Field of Classification Search
CPC  G08G 1/168; B60W 50/14; B60W 2050/143; B60W 2050/146; B62D 15/027; B60T 8/58; B60T 2201/10
See application file for complete search history.

(56) References Cited

U.S. PATENT DOCUMENTS 4,809,176 A * 2/1989 Oowa ................. B60G 17/0162
188/266.2
5,343,741 A * 9/1994 Nishihara ............. B60C 23/061
340/444
(Continued)

FOREIGN PATENT DOCUMENTS

DE   102004047481 A1 *  4/2006  ............. G08G 1/168
GB       2484705 A  *   4/2012  ........... G01S 15/931
(Continued)

OTHER PUBLICATIONS

Translation of KR-20190034803-A, 11 pages (Year: 2019).*
(Continued)

*Primary Examiner* — Dale W Hilgendorf
(74) *Attorney, Agent, or Firm* — Carlson, Gaskey & Olds, P.C.

(57) ABSTRACT

There is provided a parking aid control system (110) and method (600) for a vehicle (200). The control system (110) is configured to generate a parking aid signal (135) for assisting a driver of the vehicle. The control system (110) is configured to receive an indication (145) of a gear selection made by a driver of the vehicle; receive, from a plurality of proximity sensors (120) associated with the vehicle, proximity data (125) indicative of a location of one or more objects in an environment of the vehicle; determine a direction of travel of the vehicle in dependence on the gear selection (145); and selectively output a parking aid signal (135) for outputting to a driver of the vehicle an indication
(Continued)

of the location of at least some of the objects in dependence on the direction of travel of the vehicle.

13 Claims, 7 Drawing Sheets

(51) Int. Cl.
    *B60W 50/14*      (2020.01)
    *B62D 15/02*      (2006.01)

(52) U.S. Cl.
    CPC .... *B60T 2201/10* (2013.01); *B60W 2050/143* (2013.01); *B60W 2050/146* (2013.01)

(56) References Cited

U.S. PATENT DOCUMENTS

| | | | | |
|---|---|---|---|---|
| 5,818,355 | A * | 10/1998 | Shirai | B60K 28/10 340/904 |
| 2010/0045448 | A1 * | 2/2010 | Kakinami | G06V 20/586 382/154 |
| 2015/0015714 | A1 * | 1/2015 | Gokan | B60R 11/04 348/148 |
| 2015/0057918 | A1 * | 2/2015 | Sugano | B60T 7/22 701/301 |
| 2015/0066280 | A1 * | 3/2015 | Kim | B60W 30/06 701/23 |
| 2015/0197254 | A1 * | 7/2015 | Wysietzki | B60W 40/10 701/41 |
| 2015/0203081 | A1 * | 7/2015 | Paulson | B60T 8/58 701/70 |
| 2015/0258989 | A1 * | 9/2015 | Okano | B60W 40/105 701/1 |
| 2016/0078766 | A1 * | 3/2016 | Kiyokawa | B62D 15/028 340/932.2 |
| 2018/0339701 | A1 | 11/2018 | Kwon | |
| 2019/0329744 | A1 * | 10/2019 | Kim | B60T 8/58 |
| 2020/0317126 | A1 * | 10/2020 | Watanabe | B62D 15/027 |

FOREIGN PATENT DOCUMENTS

| | | | | |
|---|---|---|---|---|
| JP | 2004203359 A * | 7/2004 | | B62D 15/027 |
| JP | 5989729 B2 * | 9/2016 | | B62D 15/027 |
| KR | 101603072 B1 | 3/2016 | | |
| KR | 20160123128 A * | 10/2016 | | B60W 50/14 |
| KR | 20190034803 A * | 4/2019 | | G08G 1/168 |
| KR | 20190106842 A | 9/2019 | | |

OTHER PUBLICATIONS

Translation of DE-102004047481-A1, 6 pages (Year: 2006).*
Translation of KR-20160123128-A, 8 pages (Year: 2016).*
Translation of JP-5989729-B2, 11 pages (Year: 2016).*
Translation of JP-2004203359-A, 19 pages (Year: 2004).*
International Search Report and Written Opinion of the International Searching Authority for International application No. PCT/EP2021/080199 dated Feb. 9, 2022.
Combined Search and Examination Report under Sections 17 and 18(3) for Application No. GB2017206.0 dated Aug. 19, 2021.
Communication pursuant to Article 94)3) EPC, European Application No. 21 802 320.8 dated Sep. 22, 2023.

* cited by examiner

PARKING AID CONTROL SYSTEM AND METHOD

TECHNICAL FIELD

The present disclosure relates to a parking aid control system and method. Aspects of the invention relate to a control system, a vehicle, a computer-implemented method and a computer-readable medium.

BACKGROUND

It is known to provide a parking aid system to aid the driver in adjusting a final position of a vehicle. Such parking aid systems typically comprise parking sensors mounted at the front and rear of the vehicle for detecting proximal objects, and a display for outputting an indication of the location of the proximal objects. Wheel speed data indicating a direction of travel of the vehicle influences the parking aid system, such as to selectively highlight objects towards which the vehicle is travelling. However, at low speeds which are typical during parking manoeuvres and the like, wheel speed sensors may be unable to discern the direction of travel of the vehicle. Thus, the parking aid system is prevented from providing directionally relevant information at very low speeds.

It is an aim of the present invention to address one or more of the disadvantages associated with the prior art.

SUMMARY OF THE INVENTION

Aspects and embodiments of the invention provide a control system, a vehicle, a method and a computer-readable medium as claimed in the appended claims.

According to an aspect of the present invention there is provided a parking aid control system for a vehicle. The control system comprises one or more controller. The control system is configured to: receive a torque configuration signal indicative of a selection of available traction torque for the vehicle; receive, from a plurality of proximity sensors associated with the vehicle, proximity data indicative of a location of one or more objects in an environment of the vehicle; determine a direction of travel of the vehicle in dependence on the torque configuration signal; and selectively output to the driver an indication of the location of at least some of the objects in dependence on the direction of travel of the vehicle. The torque configuration signal may be indicative of a selection of a gear of a transmission between a torque generator such as an engine or traction electric motor which may influence a range of available traction torque at a wheel of the vehicle and/or a direction of traction torque at the wheel. The torque configuration signal may be a selection of an engine rotation direction of a traction electric motor.

Advantageously, use of the selected torque configuration to determine the direction of travel is independent of the speed of the vehicle, and thus can be used to infer direction even at very low speed.

According to an aspect of the present invention there is provided a parking aid control system for a vehicle. The control system comprises one or more controller. The control system is configured to: receive an indication of a gear selection made by a driver of the vehicle; receive, from a plurality of proximity sensors associated with the vehicle, proximity data indicative of a location of one or more objects in an environment of the vehicle; determine a direction of travel of the vehicle in dependence on the gear selection; and selectively output to the driver an indication of the location of at least some of the objects in dependence on the direction of travel of the vehicle. The gear selection may be indicative of a position of a gear selector in a vehicle cabin. The gear selection may in some vehicles be indicative of a configuration selected by the driver through a user input, such as a button, a paddle or a touch screen. Advantageously, use of the gear selection to determine the direction of travel is independent of the speed of the vehicle, and thus can be used to infer direction even at very low speed.

The control system may be configured to selectively output the indication of the location of at least some of the objects when the direction of travel of the vehicle is substantially towards the location of the at least some of the objects. Beneficially, even at low speed, the control system may provide directionally targeted information to the driver.

Optionally, the control system is configured to determine the direction of travel of the vehicle to be forwards in dependence on the gear selection being for a forward gear; and selectively output to the driver an indication of the location of one or more objects detected by front proximity sensors associated with a front of the vehicle in dependence on the direction of travel being determined to be forwards. The forward gear may for example be a "drive" or "sport" gear in an automatic vehicle. In a manual vehicle, the forward gear may for example be a first gear or a second gear. Optionally, the control system is configured to determine the direction of travel to be rearwards in dependence on the gear selection being for a reverse gear; and selectively output to the driver an indication of the location of one or more objects detected by rear proximity sensors associated with a rear of the vehicle in dependence on the direction of travel being determined to be rearwards. Beneficially, specifically delineating between forward and reverse gear selections enables objects detected by relevant forward or rear proximity sensors to be easily selected for output.

Optionally, the control system is configured to receive wheel speed data from one or more wheel speed sensors associated with the vehicle; and in dependence on the wheel speed data meeting one or more conditions, determine the direction of travel of vehicle in dependence on the gear selection. The one or more conditions may be indicative that the wheel speed data is insufficient to infer the direction of travel of the vehicle. Beneficially, the wheel speed data may be used to infer the direction of travel if sufficient, thus improving the reliability of the determination of the direction of travel.

The one or more conditions may comprise the wheel speed data from at least one wheel speed sensor lacking directional data. That is, at least one wheel speed sensor may be unable to determine a direction of wheel travel. For example, this may be because the wheel speed is too slow for the wheel speed sensor to detect a direction. Optionally, the one or more conditions may comprise the wheel speed data from at least two wheel speed sensors comprising contrasting directional data. That is, two wheel speed sensors may indicate opposing directions of wheel travel. For example, first wheel speed data from a first wheel speed sensor may be indicative of forward travel, and second wheel speed data from a second wheel speed sensor may be indicative of reverse travel. Beneficially, missing or contrasting wheel speed data may be indicative that a direction of travel of the vehicle cannot be inferred with sufficient accuracy, and thus the system can selectively utilise the gear selection to improve the accuracy when required. When the wheel speed data is sufficient, beneficially the system need not utilise the gear selection, improving the efficiency of the parking aid system.

Optionally, the control system is configured to: determine a vehicle speed in dependence on the wheel speed data; and in dependence on the vehicle speed being below a threshold, determine the direction of travel of vehicle in dependence on the gear selection. For example, the threshold may be around 1 km/h. Optionally, in dependence on the vehicle speed being above the threshold, the control system may be configured to determine the direction of travel of the vehicle in dependence on the wheel speed data. Beneficially, the gear selection may be selectively used at low speeds where the wheel speed sensors are known to be inaccurate or insufficient.

In some embodiments, the control system is configured to determine that the vehicle is stationary in dependence on the wheel speed data; and inhibit output of the indication in dependence on the vehicle speed being determined to be stationary. Advantageously, wheel speed sensors may be able to provide speed data for lower speeds than directional data is available. Utilising the speed data enables the control system to distinguish between stationary and very low speed movement, inhibiting undesired output when the vehicle is stationary and thus the information is not required. Optionally, the control system is configured to inhibit output of the indication in dependence on the vehicle speed being determined to be stationary for at least a threshold time. For example, the threshold time may be between 3 and 7 seconds. In one embodiment, the threshold time may be 5 seconds. Beneficially, this enables the continuation of output based on the gear selection whilst the vehicle is initially stationary, in case the parking manoeuvre has not yet concluded, but only temporarily stopped, for example to change direction.

Optionally, the control system is configured to selectively output an auditory indication to the driver. The control system may be configured to determine the auditory indication to vary in dependence on a proximity of the one or more objects to the vehicle. In some embodiments, the control system may be configured to determine the auditory indication to vary in one or more of volume, pitch or frequency of intermittent sound. Advantageously, the driver may be provided with information without requiring the driver to look at a display.

The one or more controller may comprise at least one electrical input for receiving the indication of the gear selection and the proximity data; an electrical output for outputting the indication of the location of the one or more objects; and one or more electronic processors for operatively executing computer-readable instructions to determine the direction of travel of the vehicle. Optionally, the computer-readable instructions are stored in a computer-readable medium accessible to the one or more electronic processors.

According to another aspect, there is provided a parking aid system comprising: a parking aid control system as described above; at least one sensor unit associated with the vehicle comprising a plurality of proximity sensors, the sensor unit being configured to communicate to the control system proximity data indicative of a location of one or more objects in an environment of the vehicle; a gear selector configured to communicate to the control system an indication of a gear selection made by a driver of the vehicle; and a user interface for outputting an indication of the location of the objects to the driver.

According to another aspect, there is provided a vehicle comprising a parking aid control system as described above.

According to a further aspect, there is provided a computer-implemented method for providing parking aid, the method comprising: receiving an indication of a gear selection made by a driver of a vehicle; receiving, from a plurality of proximity sensors associated with the vehicle, proximity data indicative of a location of one or more objects in an environment of the vehicle; determining a direction of travel of the vehicle in dependence on the gear selection; and selectively outputting to the driver an indication of the location of at least some of the objects in dependence on the direction of travel of the vehicle.

Optionally, the method comprises determining the direction of travel of the vehicle to be forwards in dependence on the gear selection being for a forward gear; and selectively outputting to the driver an indication of the location of one or more objects detected by front proximity sensors associated with a front of the vehicle in dependence on the direction of travel being determined to be forwards. The method may comprise determining the direction of travel to be rearwards in dependence on the gear selection being for a reverse gear; and selectively outputting to the driver an indication of the location of one or more objects detected by rear proximity sensors associated with a rear of the vehicle in dependence on the direction of travel being determined to be rearwards.

Optionally, the method may comprise receiving wheel speed data from one or more wheel speed sensors associated with the vehicle; and in dependence on the wheel speed data meeting one or more conditions, determining the direction of travel of vehicle in dependence on the gear selection. The one or more conditions may comprise the wheel speed data from at least one wheel speed sensor lacking directional data. The one or more conditions may comprise the wheel speed data from at least two wheel speed sensors comprising contrasting directional data. The method may comprise determining a vehicle speed in dependence on the wheel speed data; and in dependence on the vehicle speed being below a threshold, determining the direction of travel of vehicle in dependence on the gear selection. Optionally, the method comprises determining that the vehicle is stationary in dependence on the wheel speed data; and inhibiting output of the indication in dependence on the vehicle speed being determined to be stationary. The inhibition of the output of the indication may be in dependence on the vehicle speed being determined to be stationary for at least a threshold time.

The method may comprise selectively outputting an auditory indication to the driver. The auditory indication may be determined to vary in dependence on a proximity of the one or more objects to the vehicle.

According to a further aspect, there is provided a computer-readable medium comprising computer software which, when executed, causes the performance of the method above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 2:
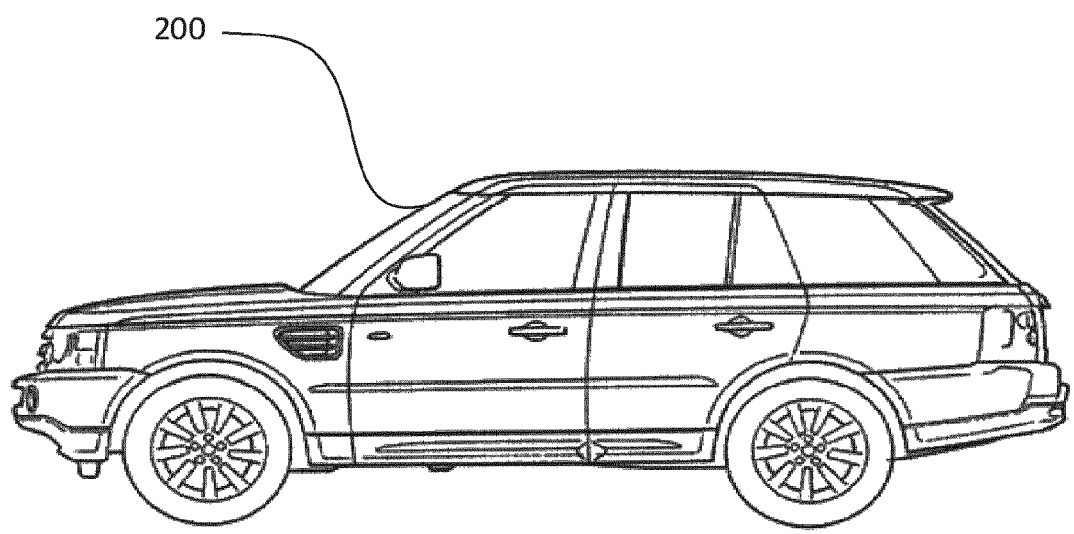
FIG. 2 shows a vehicle 200 in accordance with an embodiment of the invention.

A parking aid system 100 in accordance with an embodiment of the present invention will now be described with reference to the accompanying figures. The parking aid system 100 is for selectively alerting a driver to relevant objects in the proximity of a vehicle, as will be explained. As shown in FIG. 2, the parking aid system 100 is installed in a vehicle 200. The vehicle 200 in the present embodiment is an automobile, such as a wheeled vehicle, but it will be understood that the parking aid system 100 may be used in other types of vehicle, particularly but not exclusively land vehicles.

Figure 1:
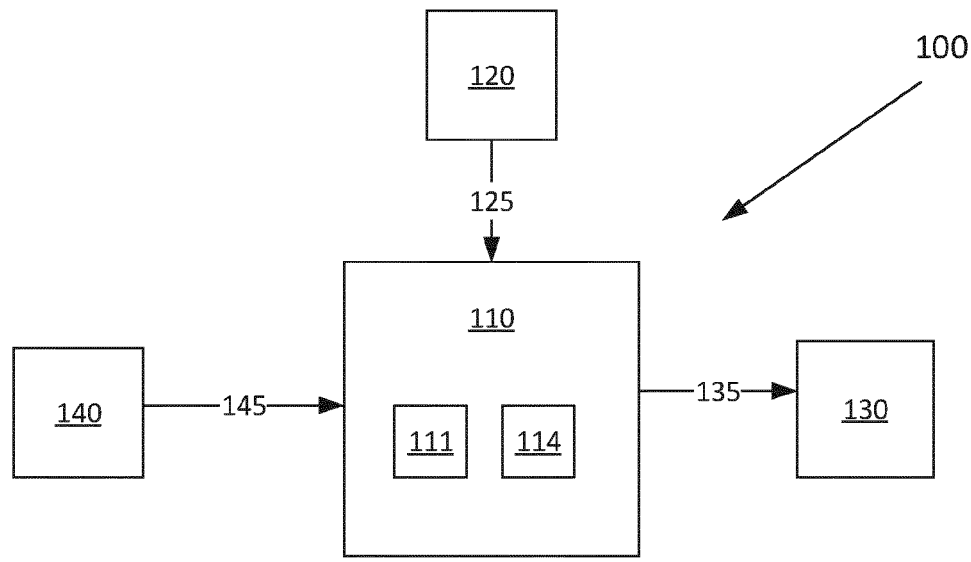
FIG. 1 shows a schematic illustration of a parking aid system according to an embodiment.

With reference to FIG. 1, the parking aid system 100 comprises a control system 110. The control system 110 comprises processing means 111 and memory means 114. The processing means 111 may be one or more electronic processing devices which operably execute computer-readable instructions. The memory means 114 may be one or more memory devices. The memory means 114 is electrically coupled to the processing means 111. The memory means 114 is configured to store instructions, and the processing means 111 is configured to access the memory means 114 and execute the instructions stored thereon.

The control system 110 is communicably coupled to one or more sensor units 120 associated with the vehicle 200. Each sensor unit 120 in the present embodiment comprises at least one proximity sensor for detecting objects in the vicinity of the vehicle. Each proximity sensor, also referred to as a parking sensor, may comprise an ultrasonic sensor, a radar sensor or a LIDAR sensor. Alternatively, or in addition, the sensor unit 120 may comprise other types of sensors, such as one or more optical cameras.

Figure 3:
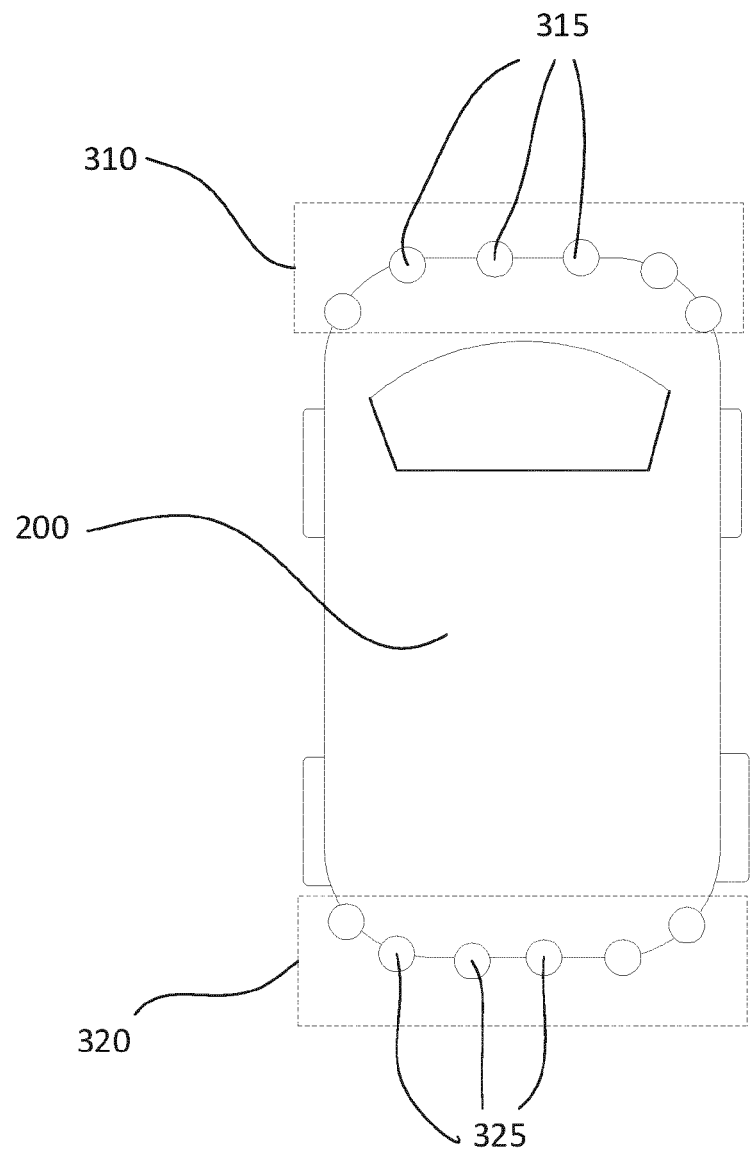
FIG. 3 shows a schematic illustration of an arrangement of sensor units on the vehicle 200 according to an embodiment.

In an embodiment of the invention, the control system 110 is communicably coupled to at least two sensor units 120. The at least two sensor units 120 comprise a front sensor unit 310 and a rear sensor unit 320 as illustrated in FIG. 3. The front sensor unit 310 comprises an arrangement of front proximity sensors or sensor devices 315. Each front proximity sensor 315 is arranged to detect objects in the vicinity of a respective region of a front of the vehicle. In some embodiments, the region of each sensor may overlap partially with that of another sensor. In some embodiments, the front proximity sensors 315 may be arranged on or within a body of the vehicle, such as on a front bumper of the vehicle. The front proximity sensors 315 may further extend to either side of the vehicle. The rear sensor unit 320 comprises an arrangement of rear proximity sensors 325. Each rear proximity sensor 325 is arranged to detect objects in the vicinity of a respective region of a rear of the vehicle. In some embodiments, the rear proximity sensors 325 may be arranged on or within a body of the vehicle, such as on a rear bumper of the vehicle. The rear proximity sensors 325 may further extend to either side of the vehicle. It will be appreciated that in other embodiments, the sensor unit(s) may be alternatively arranged. For example, all proximity sensors 315, 325 associated with the vehicle may form a single sensor unit 120. In some embodiments, more than two sensor units 120 may be associated with the vehicle. For example, a plurality of sensor units 120 may be associated with each of the front and the rear of the vehicle. In some embodiments, one or more sensor units 120 may be associated with each lateral side of the vehicle.

The control system 110 is configured to receive proximity data 125 from the or each sensor unit 120 indicative of the environment of the vehicle 200. The proximity data 125 is indicative of a location of one or more objects in an environment of the vehicle 200.

The control system 110 is communicably coupled to at least one user interface 130 associated with the vehicle 200. In an illustrated embodiment, the user interface 130 comprises one or more display devices for displaying information to an occupant, such as a driver of the vehicle. The user interface 130 may additionally or alternatively comprise one or more audio output devices such as speakers. The control system 110 is configured to output a parking aid signal 135 to the user interface 130 indicative of the location of at least some of the objects detected by the sensor unit 120. The parking aid signal 135 is configured to control the user interface 130 to output an indication of the location of the objects to the driver. The indication may comprise one or more of a visual indication, an audible indication or a somatosensory indication of the location of the objects.

Figure 4A:
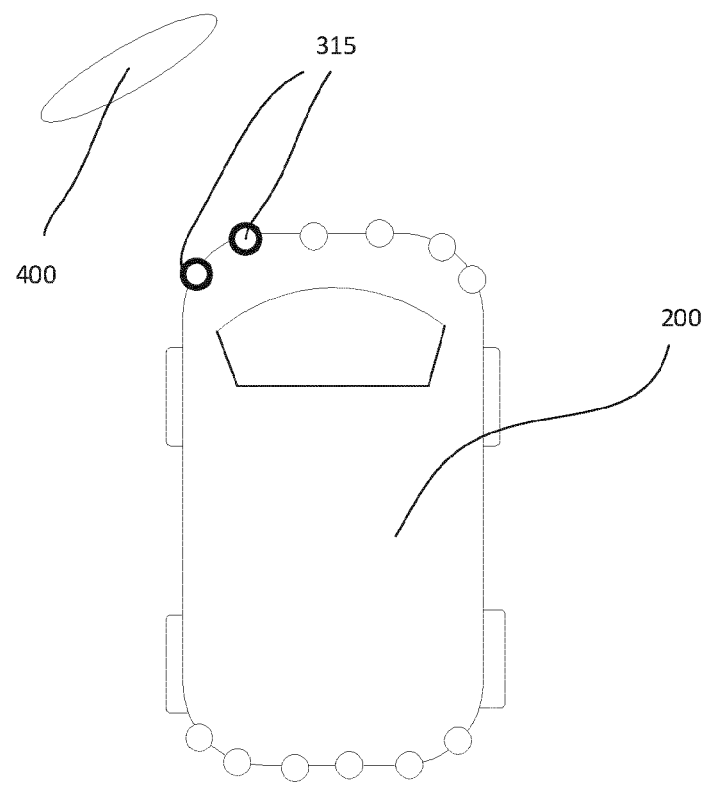
FIG. 4A illustrates the detection of an object by the sensor units.
Figure 4B:
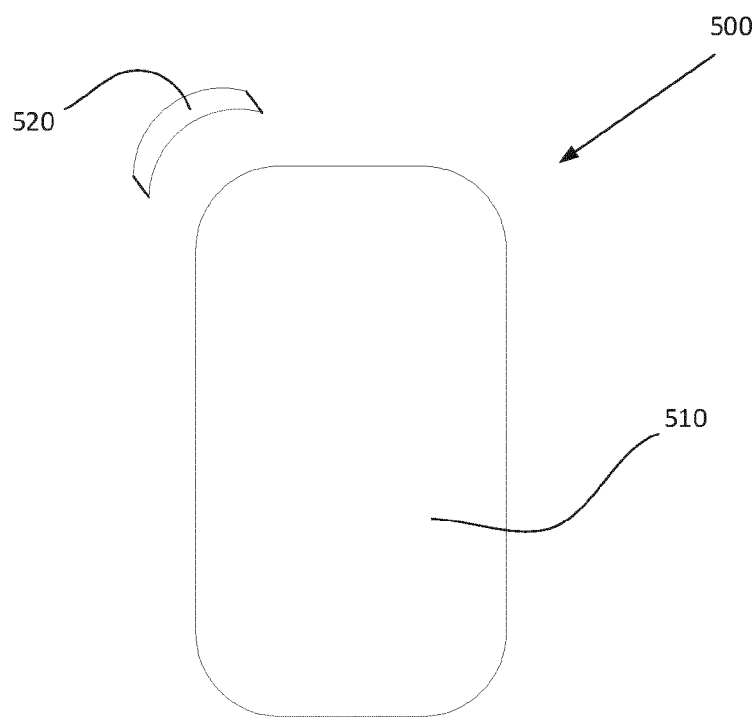
FIG. 4B illustrates an example display output of the parking aid system.

In an illustrated embodiment, as shown in FIG. 4A, an object 400 is detected by at least some of the front proximity sensors 315 of the vehicle. The control system 110 outputs a parking aid signal to the user interface 130. A display device 130 of the user interface is then configured to display an indication 500 of the location of the object, as illustrated in FIG. 4B. In the illustrated embodiment, the displayed indication 500 comprises a representation 510 of the vehicle, and a visual representation 520 of the location of the object 400 with respect to the vehicle. The visual representation 520 may comprise a line, block or other simplified illustration of the object 400 placed at the relevant location with respect to the representation 510 of the vehicle, as shown in FIG. 4B. In other embodiments, the representation 520 may comprise a rendering or an image of the object 400 as detected by the sensor unit 120. The representation 520 may comprise an augmented representation of the object 400, for example the representation 520 may comprise highlighting or circling to emphasise the location of the object 400. It will be appreciated that alternative representations may be used.

Figure 5A:
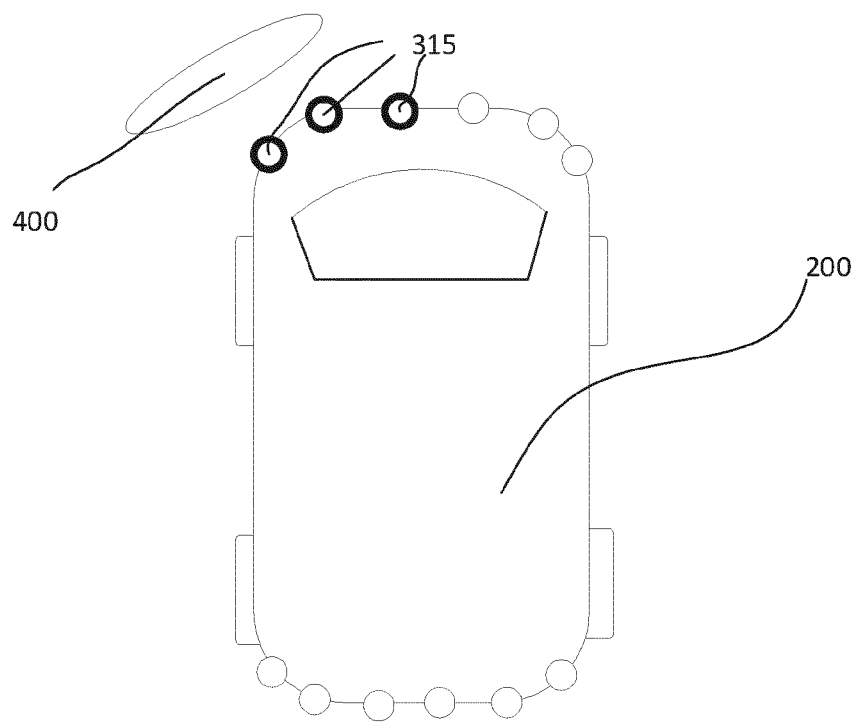
FIG. 5A illustrates the detection of an object by the sensor units.
Figure 5B:
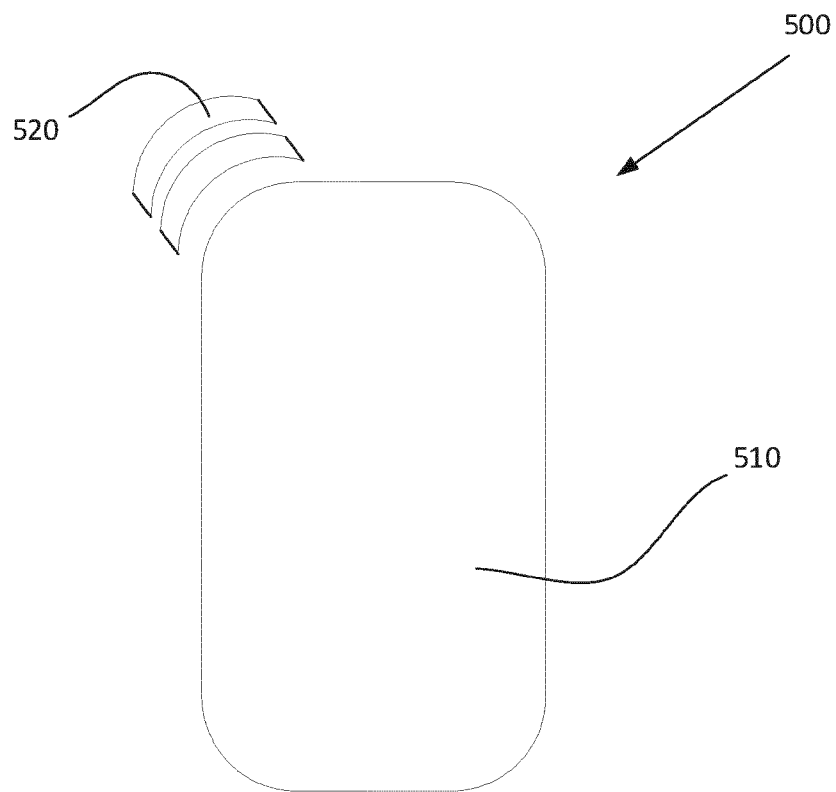
FIG. 5B illustrates an example display output of the parking aid system.

The visual representation 520 of the location of the object 400 may vary depending on the proximity of the object 400 to the vehicle. FIG. 5A illustrates an example where the vehicle 200 is situated closer to the object 400 than in FIG. 4A. The indication 500 displayed by the display device may then be configured to change to reflect the increased proximity of the vehicle to the object 400. The representation 520 of the location of the object may be made more prominent, such as by increasing the size of the representation 520 as illustrated in FIG. 5B. In other embodiments, the control system may be configured to output the parking aid signal 135 to adjust the colour, brightness or location of the representation 520 on the display device 130.

Alternatively, or additionally, the control system may be configured to output the parking aid signal 135 to an audio output device to output an audible indication of the location of the object 400. The control system 110 may be configured to cause the audible indication to vary, for example in frequency or volume, to indicate the relative proximity of the object to the vehicle. In some embodiments, the audio output device is configured to output sound as though emanating from the location of the object relative to the vehicle.

The control system 110 is configured to determine the parking aid signal 135 in dependence on a direction of travel of the vehicle. In particular, objects towards which the vehicle is travelling may be selectively notified or highlighted to the driver in preference to those in an opposing direction. For example, the parking aid signal 135 may only comprise an indication of the location of objects towards which the vehicle is travelling. In these embodiments, no indication may be output to the driver of the location of objects detected by the proximity sensors but from which the vehicle is diverging. Alternatively, the parking aid signal 135 may comprise supplementary data highlighting the objects towards which the vehicle is travelling. In this way, an indication may be output to the driver of the location of all detected objects, but the objects towards which the vehicle is travelling may be specifically highlighted. For example, the specific highlighting may comprise the provision of an extra audible notification or visual highlighting.

The control system 110 is communicably coupled to a torque configuration selector 140. The torque configuration selector 140 may be configured to control a gear of a transmission between a torque generator such as an engine or traction electric motor which may influence a direction of traction torque at a wheel of the vehicle. The torque configuration signal may be a selection of an engine rotation direction of a traction electric motor. In some embodiments, the torque configuration selector comprises a gear selector 140. The communication between the control system 110 and the gear selector 140 is for the purpose of determining the direction of travel of vehicle, as will be explained. A user may select a gear for the vehicle at an interface associated with the gear selector 140. The gear selector 140 may comprise a manual gear selection interface such as a gear stick, lever or manual control. The driver may thus select a gear for the vehicle by adjusting a position of the gear selector 140. In some embodiments, the gear selector 140 may comprise an electronic user interface through which the driver of the vehicle may select a gear for the vehicle. The electronic user interface may for example comprise a touch screen or button. The control system 110 is configured to receive, from the gear selector 140, a gear selection signal 145 indicative of a gear selection made by the driver of the vehicle. In some embodiments, the gear selection signal 145 may not be received directly from the gear selector 140, but rather via one or more further vehicle control systems. The gear selection may be utilised by the control system 110 to infer the direction of travel of the vehicle 200 and determine the parking aid signal 135, as will be explained.

According to some embodiments, the control system 110 is communicably coupled to one or more wheel speed sensors associated with the vehicle 200. The control system 110 may be configured to receive wheel speed data indicative of the speed of one or more wheels of the vehicle from the one or more wheel speed sensors. A wheel speed sensor may be associated with each wheel of the vehicle 200. Each wheel speed sensor is configured to detect a wheel speed of its associated wheel and output a respective wheel speed signal. The wheel speed sensor may be any known tachometer, for example a ferromagnetic toothed ring and associated magnetic sensor. The structure of the wheel speed sensor will determine its sensing accuracy. For example, for a ferromagnetic toothed ring, the sensing accuracy will be at least in part determined by a number of teeth around the ring and thus a distance between each tooth. The spacing of the teeth influence the sensing accuracy of the sensor as will be appreciated. The sensing accuracy of the wheel speed sensor will define a minimum detectable wheel speed which can be accurately detected by the wheel speed sensor, and a minimum directional wheel speed which enables the direction of the wheel to be accurately detected by the wheel speed sensor. Typically, the minimum directional wheel speed is greater than the minimum detectable wheel speed. Thus, at low speeds, the wheel speed sensors may be able to determine wheel speed but not wheel direction.

Figure 6:
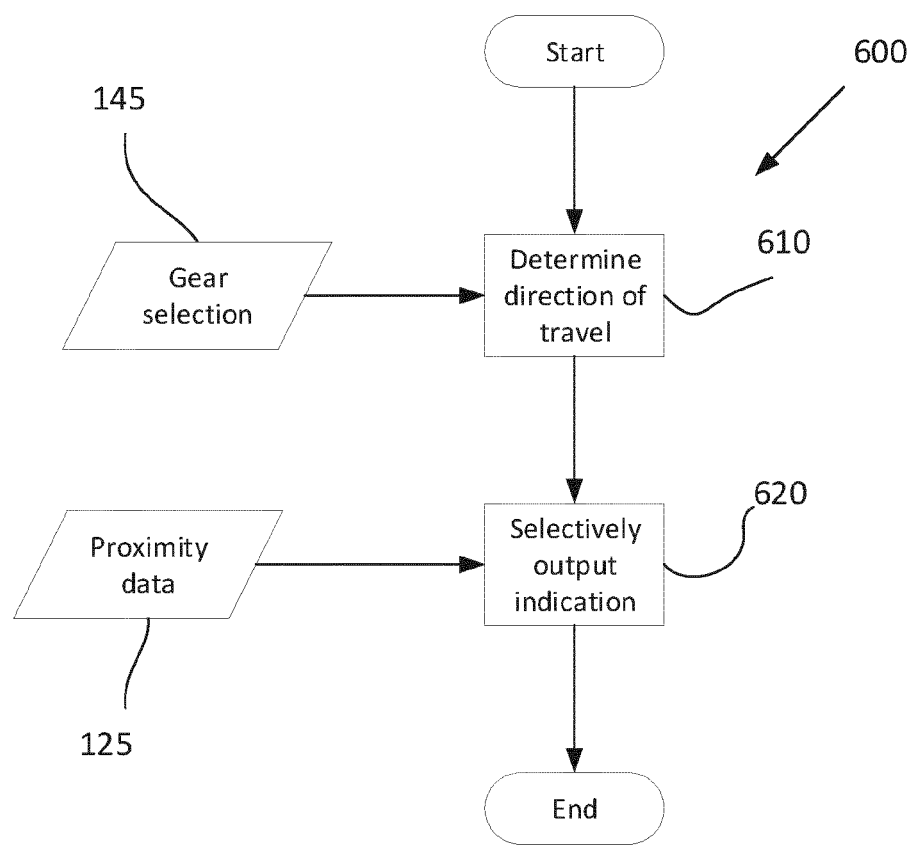
FIG. 6 illustrates a method according to an embodiment of the invention.

A method 600 for selectively generating the parking aid signal 135 by the control system 110 is illustrated in FIG. 6.

The method 600 comprises receiving an indication 145 of a gear selection made by a driver of the vehicle. The indication 145 comprises the gear selection signal received from the gear selector 140, as discussed. The gear selection may be for a forward gear or a reverse gear of the vehicle. For example, a forward gear may be a drive, sport, first or second gear. The forward gear may be any gear of the vehicle associated with forward travel. The reverse gear may be any gear of the vehicle associated with reverse travel. The gear selection may be used in the determination of the direction of travel of vehicle.

The method 600 comprises a block 610 of determining a direction of travel of the vehicle in dependence on the gear selection. In particular, block 610 may comprise determining the direction of travel of the vehicle to be forwards in dependence on the gear selection being for a forward gear or determining the direction of travel to be rearwards in dependence on the gear selection being for a reverse gear. It will be appreciated that some vehicles may have multiple forward gears, such as $1^{st}$, $2^{nd}$ etc, and other vehicles may have one or more gears associated with one or more modes or configurations, such as Drive and Sport selections of a forward gear.

According to some embodiments, the gear selection is used to determine the direction of travel in block 610 only selectively. In certain circumstances, the direction of travel of the vehicle may be determined by alternate means, such as in dependence on the wheel speed data. An illustration of determination of the direction of travel of the vehicle in block 610 according to an embodiment is shown in FIG. 7.

Figure 7:
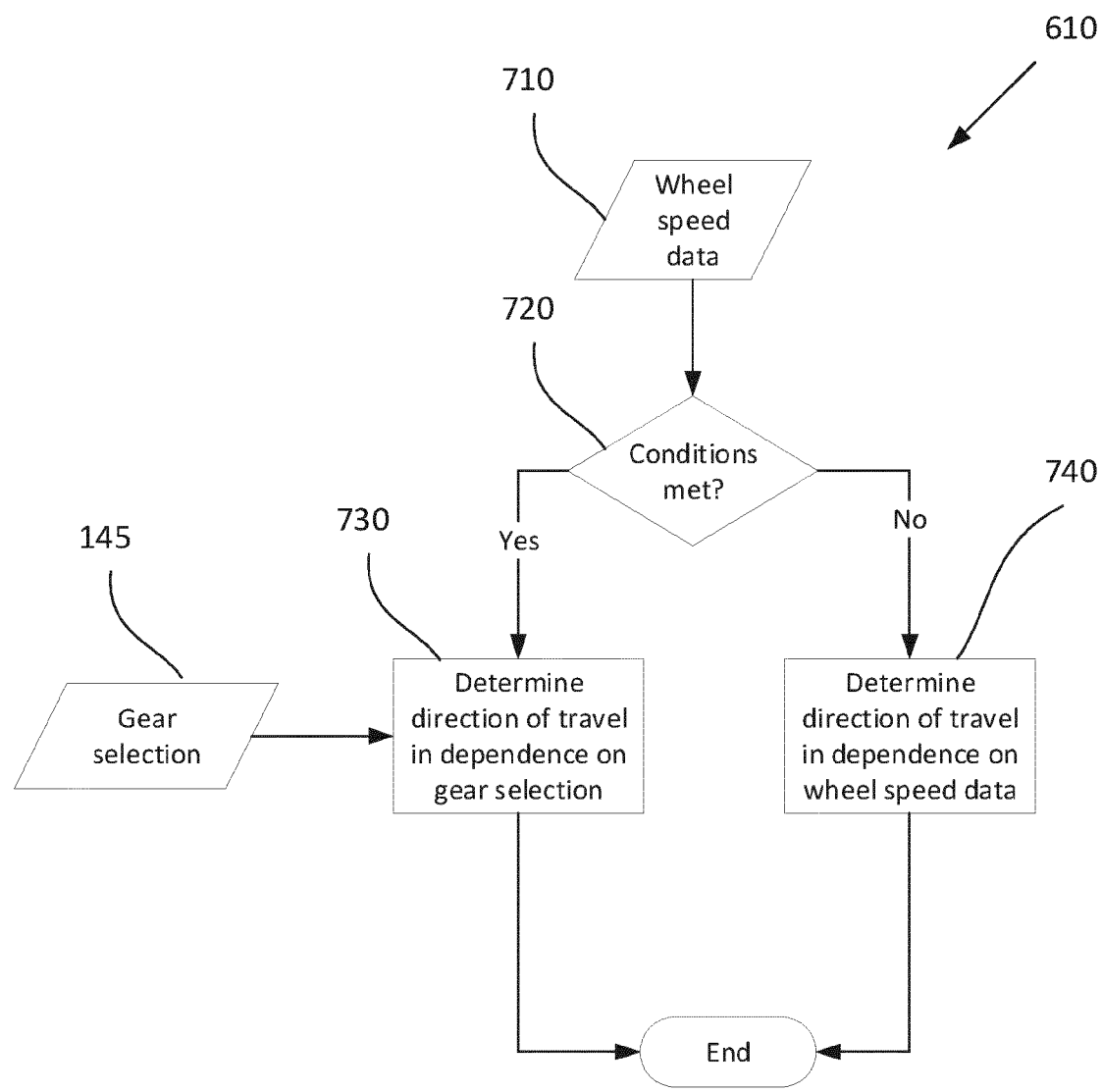
FIG. 7 illustrates a method for determining the direction of travel according to an embodiment.

With reference to FIG. 7, block 610 may comprise receiving wheel speed data 710 from the one or more wheel speed sensors associated with the vehicle. The wheel speed data 710 is indicative of a wheel speed detected by each wheel speed sensor.

Block 610 comprises a step 720 of determining whether the wheel speed data 710 meets one or more conditions. The one or more conditions are determined to be indicative that the wheel speed data is insufficient to infer the direction of travel of the vehicle. As discussed, wheel speed sensors may only reliably detect direction of travel above a certain speed. At low speeds, which may be below a threshold speed, detection of direction by the wheel speed sensors may be unreliable or impossible.

According to some embodiments, the one or more conditions comprise the wheel speed data from at least one wheel speed sensor lacking directional data. That is, at least one wheel speed may be too slow for the associated wheel speed sensor to detect a direction. Thus, wheel speed data transmitted from that wheel speed sensor may lack a directional component. If the wheel speed data from at least one wheel speed sensor lacks a directional component, it may be determined that the wheel speed data is insufficient.

The one or more conditions may comprise the wheel speed data from at least two wheel speed sensors being inconsistent such as comprising contrasting directional data. That is, at least two wheel speed sensors may lack agreement on a direction of travel. This may be particularly prevalent on uneven terrain, where wheel speed may diverge significantly between wheels. Thus, first wheel speed data from a first wheel speed sensor may be indicative of forward travel, and second wheel speed data from second wheel speed sensor may be indicative of reverse travel. This condition may be indicative that the wheel speed data is unreliable, and thus insufficient to infer the direction of travel of the vehicle.

In some embodiments, step 720 comprises determining a vehicle speed in dependence on the wheel speed data. The one or more conditions may then comprise the vehicle speed being below a threshold. The threshold may be a speed threshold below which the wheel speed sensors are unreliable in detecting a vehicle direction. For example, the threshold may be between 0.5 km/h and 2 km/h. In an illustrative embodiment, the threshold may be 1 km/h.

If the one or more conditions are met in step 720, that is if it is determined the wheel speed data is insufficient, block 610 proceeds to step 730. In step 730, the direction of travel is determined in dependence on the gear selection 145, as has been described. In this way, at low speeds, when the wheel speed data is unreliable, the direction of travel may be inferred from the gear selection. If the driver has selected a reverse gear, the direction of travel may be inferred to be reverse. If the driver has selected a forward gear, the direction of travel may be inferred to be forward.

If the one or more conditions are not met in step 720, that is if it is determined the wheel speed data is sufficient, block 610 proceeds to step 740. In step 740, the direction of travel is determined in dependence on the wheel speed data 710. In this way, if the wheel speed data is reliable, the direction of travel may be inferred from the wheel speed data rather than the gear selection. This may improve the overall reliability of the system, as the wheel speed data is more directly tied to the actual behaviour of the vehicle than the gear selection. If the wheel speed data indicates the wheels are rotating for reverse travel, the direction of travel may be inferred to be reverse. If the wheel speed data indicates the wheels are rotating for forward travel, the direction of travel may be inferred to be forward.

Returning to FIG. 6, the method 600 comprises receiving proximity data 125 indicative of a location of one or more objects in an environment of the vehicle. The proximity data 125 is received from the plurality of proximity sensors 315, 325. With reference to the example illustrated in FIGS. 4A to 5B, the proximity data 125 may be indicative of a location of the object 400 relative to the vehicle.

The method 600 comprises a block 620 of selectively outputting to the driver an indication of the location of at least some of the objects in dependence on the direction of travel of the vehicle. Thus, the parking aid signal 135 communicated to the user interface 130 by the control system 110 may be determined or modified in dependence on the direction of travel of the vehicle. In particular, block 620 may comprise selectively outputting the indication of the location of an object when the direction of travel of the vehicle is substantially towards the object. A longitudinal axis of the vehicle may be defined as an axis running from a front to a rear of the vehicle. The direction of travel of the vehicle may be considered substantially towards the object if the object is located within a predetermined angle of the longitudinal axis in the direction of travel, i.e. forward or rearward. That is, the predetermined angle may define a cone extending outwards from the front or the rear of the vehicle depending on the direction of travel. If the object is located within the cone, the direction of travel of the vehicle may be considered substantially towards the object.

As discussed, in block 610 it may be determined whether the direction of travel is forwards or reverse. Block 620 may then comprise identifying the objects in the proximity data located towards the front or rear of the vehicle respectively. For example, objects located towards the front of the vehicle may be detected by front proximity sensors and objects located towards the rear of the vehicle may be detected by rear proximity sensors. If the direction of travel is determined to be forwards, block 620 may comprise selectively outputting to the driver an indication of the location of one or more objects located in front of the vehicle. If the direction of travel is determined to be reverse, block 620 may comprise selectively outputting to the driver an indication of the location of one or more objects located to the rear of the vehicle. The selective output may comprise only outputting an indication of the selected objects, or it may comprise highlighting the selected objects, as has been discussed.

For example, in FIG. 4A the object 400 is located in front of the vehicle 200 and detected by front proximity sensors 315. If it is determined that the vehicle 200 is moving forwards, towards the object 400, in block 620 the control system 110 may output to the user interface a parking aid signal to display a selective indication of the location of the object 400 such as illustrated in FIG. 5B. If the vehicle 200 were to shift direction to reverse away from the object, in block 620 the parking aid signal may be modified by the control system 110 to remove or reduce the indication 520 of the object 400 due to the reduced relevance of the object 400 to the driver.

In some embodiments, it may be determined in block 610 that the vehicle is stationary. The vehicle may be determined to be stationary in dependence on one or both of the wheel speed data indicating that the vehicle is stationary or the gear selection indicating a stationary gear such as "park". If the vehicle is determined to be stationary in block 610, in block 620 the control system 110 may inhibit the output of the parking aid signal such that the output of the indication of the location of the object to the driver is removed. The parking aid signal may be inhibited immediately upon the vehicle making a stop. However, in some embodiments, the control system 110 is configured to inhibit the parking aid signal in dependence on the vehicle being stationary for at least a threshold time. The threshold time may be selected such that it indicates a likelihood the driver has ceased maneuvering the vehicle. For example, the threshold time may be from 4 to 6 seconds. In an illustrative embodiment, the threshold time may be 5 seconds. In this way, inconvenient or irrelevant notification to the driver of surrounding objects when the vehicle is stopped are mitigated.

It can therefore be seen that the present invention provides a method and system for alerting the driver of the vehicle to relevant surrounding objects during a parking manoeuvre, even at very low speeds. The direction of travel of the vehicle may be reliably and consistently determined irrespective of the speed of the vehicle, and the driver may be provided with relevant audible or visual feedback regarding objects towards which the vehicle is travelling.

Figure 8:
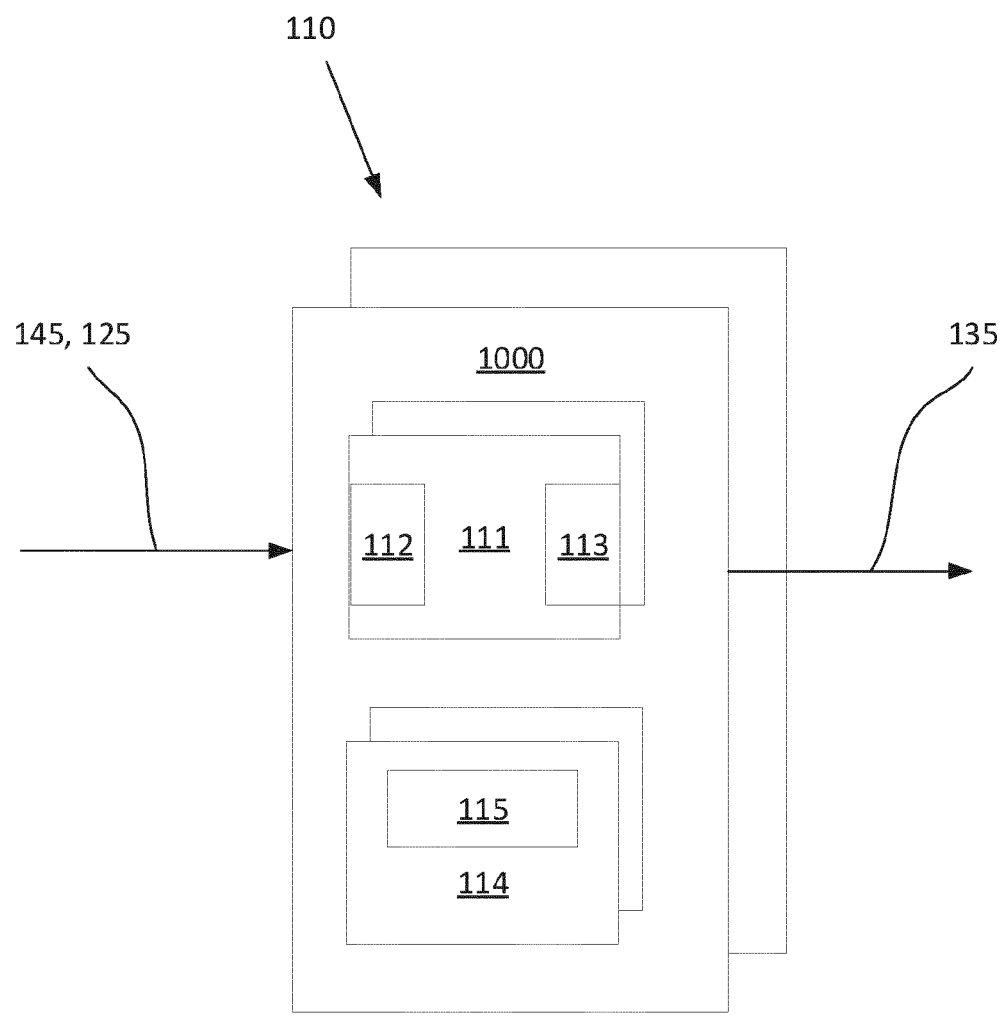
FIG. 8 shows a schematic illustration of the control system 110 according to an embodiment.

With reference to FIG. 8, there is illustrated a simplified example of a control system 110 such as may be adapted to implement the method described herein. The control system 110 comprises one or more controllers 1000 and is configured to generate a parking aid signal 135 for assisting a driver of the vehicle. The control system 110 is configured to receive an indication 145 of a gear selection made by a driver of the vehicle. The control system is configured to receive, from a plurality of proximity sensors 120 associated with the vehicle, proximity data 125 indicative of a location of one or more objects in an environment of the vehicle. The control system 110 is configured to determine a direction of travel of the vehicle in dependence on the gear selection 145, and selectively output a parking aid signal 135 for outputting to a driver of the vehicle an indication of the location of at least some of the objects in dependence on the direction of travel of the vehicle.

It is to be understood that the or each controller 1000 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 1000 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 1000 to implement the control techniques described herein (including some or all of the functionality required for the method described herein). The set of instructions could be embedded in said one or more electronic processors of the controller 1000; or alternatively, the set of instructions could be provided as software to be executed in the controller 1000. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 8, the or each controller 1000 comprises at least one electronic processor 111 having one or more electrical input(s) 112 for receiving one or more input signals, and one or more electrical output(s) 113 for outputting one or more output signals. The or each controller 1000 further comprises at least one memory device 114 electrically coupled to the at least one electronic processor 111 and having instructions 115 stored therein. The at least one electronic processor 111 is configured to access the at least one memory device 114 and execute the instructions 115 thereon.

The, or each, electronic processor 111 may comprise any suitable electronic processor (e.g., a microprocessor, a microcontroller, an ASIC, etc.) that is configured to execute electronic instructions. The, or each, electronic memory device 114 may comprise any suitable memory device and may store a variety of data, information, threshold value(s), lookup tables or other data structures, and/or instructions therein or thereon. In an embodiment, the memory device 114 has information and instructions for software, firmware, programs, algorithms, scripts, applications, etc. stored therein or thereon that may govern all or part of the methodology described herein. The processor, or each, electronic processor 111 may access the memory device 114 and execute and/or use that or those instructions and information to carry out or perform some or all of the functionality and methodology describe herein.

The at least one memory device 114 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM and EEPROM); flash memory; or electrical or other types of medium for storing such information/instructions.

Example controllers 1000 have been described comprising at least one electronic processor 111 configured to execute electronic instructions stored within at least one memory device 114, which when executed causes the electronic processor(s) 111 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A parking aid control system for a vehicle, the control system comprising at least one controller, the control system being configured to:
receive an indication of a gear selection made by a driver of the vehicle;
receive, from a plurality of proximity sensors associated with the vehicle, proximity data indicative of a location of at least one object in an environment of the vehicle;
receive wheel speed data from one or more wheel speed sensors associated with the vehicle;
determine that the vehicle is stationary in dependence on the wheel speed data;
determine a direction of travel of the vehicle in dependence on the gear selection;
selectively output to the driver an indication of the location of the at least one object when the direction of travel of the vehicle is substantially towards the at least one object, the direction of travel of the vehicle being substantially towards the at least one object if the object is located within a predetermined angle of a longitudinal axis of the vehicle in the directional of travel;

in dependence on the wheel speed data meeting one or more conditions, determine the direction of travel of the vehicle dependence on the gear selection; and inhibit output of the indication in dependence on determining that the vehicle is stationary.

2. The parking aid control system according to claim 1, wherein the control system is configured to:

determine the direction of travel of the vehicle to be forward in dependence on the gear selection being for a forward gear; and selectively output to the driver the indication of the location of the at least one object detected by front proximity sensors associated with a front of the vehicle in dependence on the direction of travel being determined to be forward.

3. The parking aid control system according to claim 1, wherein the control system is configured to:

determine the direction of travel to be rearward in dependence on the gear selection being for a reverse gear; and selectively output to the driver the indication of the location of the at least one object detected by rear proximity sensors associated with a rear of the vehicle in dependence on the direction of travel being determined to be rearward.

4. The parking aid control system according to claim 1, wherein the one or more conditions comprise the wheel speed data from at least one wheel speed sensor lacking directional data.

5. The parking aid control system according to claim 1, wherein the one or more conditions comprise the wheel speed data from at least two wheel speed sensors comprising contrasting directional data.

6. The parking aid control system according to claim 1, wherein the control system is configured to:

determine a vehicle speed in dependence on the wheel speed data; and in dependence on the vehicle speed being below a threshold, determine the direction of travel of the vehicle in dependence on the gear selection.

7. The parking aid control system according to claim 1, wherein the control system is configured to inhibit output of the indication in dependence on determining that the vehicle is stationary for at least a threshold time.

8. The parking aid control system according to claim 1, wherein the control system is configured to selectively output an auditory indication to the driver.

9. The parking aid control system according to claim 8, wherein the control system is configured to vary the auditory indication in dependence on a proximity of the at least one object to the vehicle.

10. The vehicle comprising the parking aid control system according to claim 1.

11. The parking aid control system according to claim 1, wherein the predetermined angle is stored in a memory device of the controller.

12. A computer-implemented method of providing parking aid, the method comprising:

receiving an indication of a gear selection made by a driver of a vehicle;

receiving, from a plurality of proximity sensors associated with the vehicle, proximity data indicative of a location of at least one object in an environment of the vehicle;

receiving wheel speed data from one or more wheel speed sensors associated with the vehicle;

determining that the vehicle is stationary in dependence on the wheel speed data;

determining a direction of travel of the vehicle in dependence on the gear selection;

selectively outputting to the driver an indication of the location of the at least one object when the direction of travel of the vehicle is substantially towards the at least one object, the direction of travel of the vehicle being substantially towards the at least one object if the object is located within a predetermined angle of a longitudinal axis of the vehicle in the directional of travel;

in dependence on the wheel speed data meeting one or more conditions, determining the direction of travel of the vehicle in dependence on the gear selection; and inhibiting output of the indication in dependence on determining that the vehicle is stationary.

13. A non-transitory computer-readable medium comprising instructions which, when executed by at least one processor, cause the at least one processor to perform the method of claim 12.

* * * * *